Nov. 29, 1927.
J. DYER
1,650,616
PARKING CHECK
Filed April 19, 1927
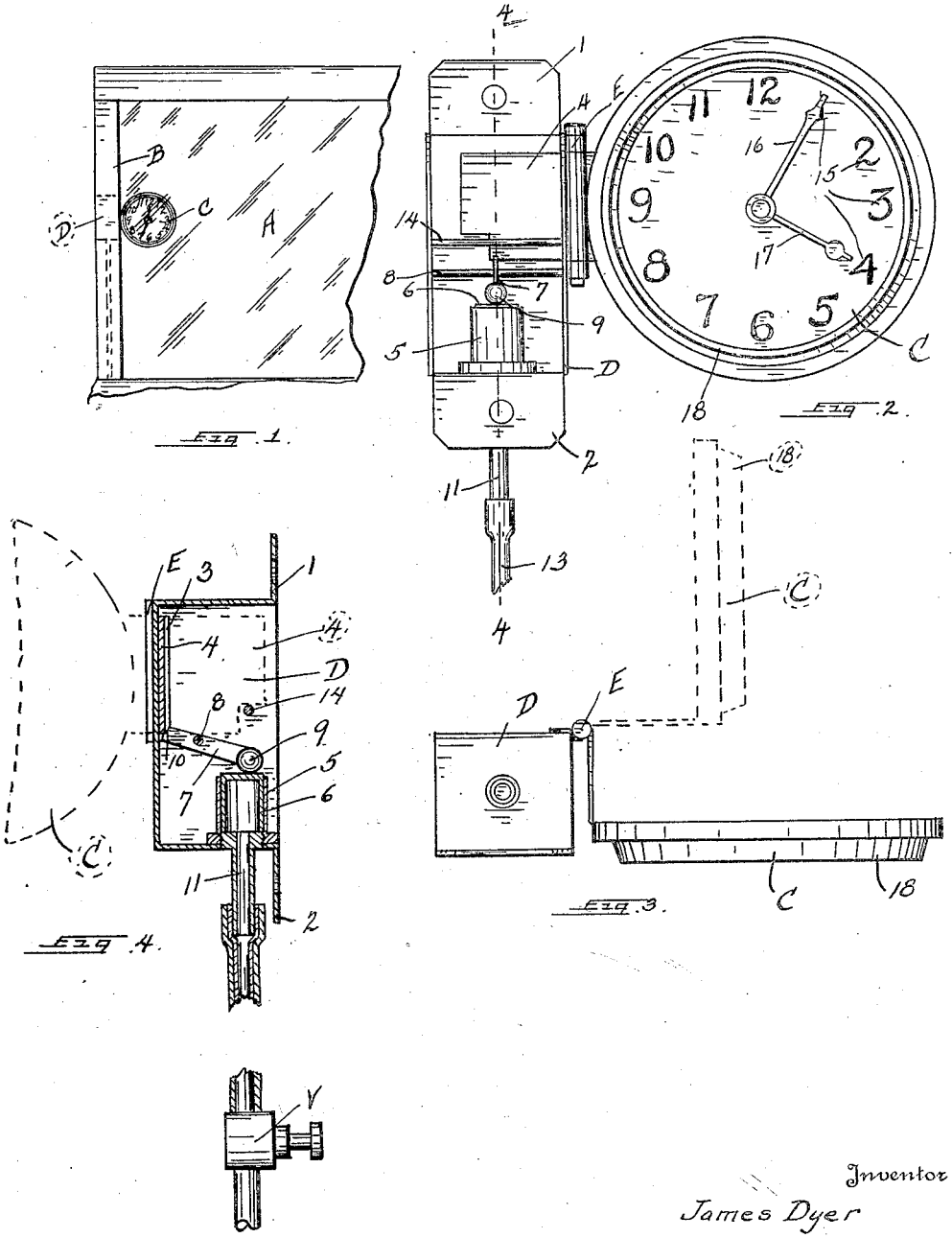
Inventor
James Dyer
By R. M. Thomas.
Attorney Patented Nov. 29, 1927.

1,650,616

UNITED STATES PATENT OFFICE.

JAMES DYER, OF WINSPER, IDAHO.

PARKING CHECK.

Application filed April 19, 1927. Serial No. 184,935.

My invention relates to the parking of automobiles on city streets where there is a time limit and has for its object to provide a new and efficient time marking mechanism which is in full view of the pedestrians and the police when the car has been parked along the side of the street.

A further object is to provide a time marking mechanism for automobiles which cannot be changed without starting the engine of said automobile and which will be easily operated by the driver of the automobile.

A still further object is to provide a time marking mechanism for automobiles which will be set when the driver leaves the car and will notify all passersby that the car was parked at such a time and which will be operated by the air force of the exhaust manifold of the automobile.

A still further object is to provide a time mechanism for automobiles which will be set when the driver leaves the car whether the car is on a time limit parking street or not and which will notify all passersby that the car was parked at such a time.

These objects I accomplish with the device illustrated in the accompanying drawings in which similar numerals and letters of reference indicate like parts throughout the several views and as described in the specification forming a part of this application and pointed out in the appended claims.

In the drawings, in which, I have shown the best and most preferred manner of building my invention Figure 1 is a front elevation of a portion of the windshield of an automobile with my device shown marking the time at which the car was parked. Figure 2 is a front elevation of the device detached from the frame of the windshield. Figure 3 is an inverted plan view of the same with dotted lines showing the movement of the time marking mechanism. Figure 4 is a section on line 4—4 of Figure 2.

In the drawings I have shown the wind shield of the automobile as A, the frame as B, and the time indicating portion of my device as C. I provide a box D, in which I mount the working parts of my device and to which box the time indicating portion C, is hingedly connected by the hinge E.

Flanges 1 and 2 are provided on the ends of the box by which it is secured to the frame of the windshield, and a slot 3 is cut along one back edge of said box and longitudinally therewith through which a wing portion 4 of the time indication portion of the device is passed. On the bottom side of said box I provide a cylindrical housing 5 in which an air operated plunger 6 is carried and longitudinally operated by the air forces developed in the exhaust manifold of the engine of the automobile. Directly on top of the said plunger 6 I provide a pivoted weighted catch lever 7. The said lever 7 is pivoted on the rod 8 and the end of said lever is weighted with a weight 9, which weight rests upon the top end of the said plunger 6. The other end of the said lever 7 is provided with a dog or catch portion 10 which portion engages with the lower end of the said wing 4 to hold said wing in fixed relation to said box when said dog 10 is engaged therewith. An air tube 11 is connected with the lower end of the said box and is in open connection with the housing 5 providing air to operate the said plunger 6.

The said air tube 11, has a tube of flexible material 13, preferably of rubber, connecting it with the source of air supply, and has a flexible metal tubing 12 there around it, so that the rubber cannot become perforated or removed from the tube 11. A stop rod 14 is provided in the said box D to prevent the plunger 6 from moving farther than necessary when it is operating the lever 7. The time indicating portion of my device is similar to the face of a clock having the numbers 15 printed thereon and hands 16 and 17 are pivotally secured in the center of said portion by which the time of parking is indicated. The said indicating portion C is pivotally hinged to the said box D by the hinge E and the wing portion 4 of said time indicating portion is secured on the other side of the hinge and cooperates with the movement of the indicating portion. The said time indicating portion has a flange 18 formed therearound which flange is adapted to fit closely to the face of the windshield when the device has been set and is so made that no one could get between the windshield and the flange to change the hands 16 and 17 of the face.

An air control valve V regulates the air when it is turned into the device and is the means by which the device is released when the driver has started his machine and is moving.

The operation of my device is as follows:— When the driver of an automobile is going to park his automobile he drives up to the curb and before leaving the car moves the hands on the time indicating portion to the hour at which he is parking. He then swings the portion C up to the windshield and when it reaches that position the weight 9 on the lever 7 engages the dog 10 with the wing 4 and secures the portion C in place adjacent to the windshield. The operator then stops his engine and the device cannot be changed until the engine is again started. To reset the device the operator must start his engine and then turn the valve V. Air from the exhaust of the engine will then force the plunger 6 upwardly actuating the lever 7 and releasing the wing 4 from the dog 10. The device may then be moved back from the wind shield and is ready to be used again when the driver stops again.

Having thus described my invention I desire to secure by Letters Patent and claim:—

1. In a time indicating device for automobiles the combination of a metal box having a slot in one edge thereof; a time indicating device hingedly connected with said box having a wing portion thereof passing through the said slot in said box; a cylindrical housing secured in said box having a plunger longitudinally operated therein; a lever pivoted in said box having one end weighted and resting upon the top end of said plunger and the other end forming a dog adapted to engage with the wing portion of said time indicating device; an air tube to supply air to said cylinder and plunger and a valve to control the air to operate said plunger.

2. In a time indicating device for automobiles the combination of a box having a time indicating device hingedly connected therewith and with a wing portion of said time device passing through a slot in said box; means to lock said wing in position within said box when said time indicating device has been set and moved adjacent the windshield of the automobile and means to release said wing by air pressure, when the engine of said automobile has been started.

In testimony whereof I have affixed my signature.

JAMES DYER.